United States Patent
Knoll et al.

(10) Patent No.: US 7,064,164 B2
(45) Date of Patent: Jun. 20, 2006

(54) TRANSPARENT STYROL-BUTADIENE BLOCK COPOLYMER MIXTURES

(75) Inventors: Konrad Knoll, Mannheim (DE); Philippe Desbois, Maikammer (DE); Hans-Michael Walter, Freinsheim (DE); Michael Ishaque, Mannheim (DE); Till Gerlach, Ludwigshafen (DE); Friederike Osswald, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/496,080

(22) PCT Filed: Nov. 19, 2002

(86) PCT No.: PCT/EP02/12933

§ 371 (c)(1),
(2), (4) Date: May 20, 2004

(87) PCT Pub. No.: WO03/046075

PCT Pub. Date: Jun. 5, 2003

(65) Prior Publication Data

US 2005/0009990 A1     Jan. 13, 2005

(30) Foreign Application Priority Data

Nov. 28, 2001 (DE) .............................. 101 58 500

(51) Int. Cl.
*C08F 297/04* (2006.01)
(52) U.S. Cl. ....................................... 525/89; 525/338

(58) Field of Classification Search ................. 525/89, 525/338
See application file for complete search history.

(56) References Cited

U.S. PATENT DOCUMENTS

| 3,333,024 A | 7/1967 | Haefele et al. |
| 3,431,323 A | 3/1969 | Jones |
| 3,598,886 A | 8/1971 | Hoeg et al. |
| 4,335,221 A | 6/1982 | Gerberding |
| 4,882,384 A | 11/1989 | Willis et al. |
| 5,036,130 A | 7/1991 | Walter et al. |
| 5,227,419 A | 7/1993 | Moczygemba et al. |
| 6,492,468 B1 | 12/2002 | Chen et al. |

FOREIGN PATENT DOCUMENTS

| EP | 492 490 | 7/1992 |
| JP | 2001163934 | 6/2001 |
| WO | 94/21694 | 9/1994 |
| WO | 00/56783 | 9/2000 |
| WO | 01/12681 | 2/2001 |
| WO | 01/44315 | 6/2001 |
| WO | 02/094899 | 11/2002 |

*Primary Examiner*—Jeffrey Mullis
(74) *Attorney, Agent, or Firm*—Novak Druce & Quigg, LLP

(57) ABSTRACT

The present invention relates to mixtures comprising linear block copolymers made from vinylaromatic monomers and from dienes of the structure (I) $S_1$-$B_1$-$S_2$ and (II) $S_3$-$B_2$-$S_4$, where $S_1$ is a block made from vinylaromatic monomers with number-average molar mass $M_n$ in the range from 40,000 to 100,000 g/mol, each of $S_2$, $S_3$ and $S_4$ is a block made from vinylaromatic monomers with number-average molar mass $M_n$ in the range from 5,000 to 20,000 g/mol, each of $B_1$ and $B_2$ is a block made from dienes or a copolymer block made from dienes and from vinylaromatic monomers with numberaverage molar mass $M_n$ in the range from 15,000 to 40,000 g/mol, and the ratio of the block copolymers (I)/(II) is in the range from 0.6 to 2.

17 Claims, No Drawings

TRANSPARENT STYROL-BUTADIENE BLOCK COPOLYMER MIXTURES

The invention relates to mixtures comprising linear block copolymers made from vinylaromatic monomers and from dienes of the structure (I) $S_1$-$B_1$-$S_2$ and (II) $S_3$-$B_2$-$S_4$, where $S_1$ is a block made from vinylaromatic monomers with number-average molar mass $M_n$ in the range from 40,000 to 100,000 g/mol, each of $S_2$, $S_3$ and $S_4$ is a block made from vinylaromatic monomers with number-average molar mass $M_n$ in the range from 5,000 to 20,000 g/mol, each of $B_1$ and $B_2$ is a block made from dienes or a copolymer block made from dienes and from vinylaromatic monomers with number-average molar mass $M_n$ in the range from 15,000 to 40,000 g/mol, and the ratio of the block copolymers (I)/(II) is in the range from 0.6 to 2. The invention further relates to processes for preparing the mixtures, and to their partial or complete hydrogenation.

Styrene-butadiene block copolymer and mixtures with polystyrene are known, with a variety of structures. The block copolymers may be linear or have star-type branching, and may have blocks of identical or different molar masses, the result being symmetrical or asymmetrical structures. The butadiene-containing blocks may also contain styrene. There may be sharp or tapered transitions between the individual blocks. An overview of styrene-butadiene block copolymers is found by way of example in Kunststoff Handbuch, Vol. 4 Polystyrol, Carl Hanser-Verlag Munich, Vienna, 1996, Chapter 3.3.4, pages 161–164.

DE-A 29 40 861 discloses mixtures of linear S-B-S three-block copolymers with varying compositions and molar masses. The mixture is obtained by sequential anionic polymerization using two joint feeds of initiator and styrene. The ratio of the amount of initiator in the first stage to that in the second stage is in the range from 1:2 to 1:7, implying that there is a marked preponderance of the block copolymer having the relatively short styrene block. The transition between the first styrene block and the butadiene-containing block is sharp, but the transition from the butadiene-containing block to the second styrene block is gradual.

U.S. Pat. No. 5,227,419 describes mixtures of block copolymers whose butadiene-containing blocks have a styrene gradient. Again, a mixture comprises a subordinate amount of the block copolymer having the relatively high styrene block content.

However, in mixtures with polystyrene, the block copolymers described lead to drastically reduced stiffness compared with that of polystyrene, while toughness is comparable. There is also a marked lowering of heat resistance.

Styrene-butadiene block copolymers and styrene-isoprene block copolymers may be hydrogenated to give polymers with different properties, for example with improved aging resistance or improved weathering resistance. Depending on the hydrogenation conditions, the olefinic double bonds may be hydrogenated selectively here (U.S. Pat. No. 4,882,384), or else both the olefinic and the aromatic double bonds may be hydrogenated (U.S. Pat. No. 3,333,024, U.S. Pat. No. 3,431,323, U.S. Pat. No. 3,598,886).

WO 94/21694 describes, by way of example, the hydrogenation of polystyrene or of styrene-butadiene block copolymers, or of styrene-isoprene block copolymers, on supported metal catalysts. Under the conditions of the reaction, it is not only the diene block which is hydrogenated, but also the phenyl groups of the polystyrene block. A polycyclohexylethylene (PCHE) block is thus produced from the polystyrene block.

WO 96/34896 describes an improved hydrogenation catalyst for the ring-hydrogenation of styrene polymers. As starting material for the ring-hydrogenation, that specification uses not only polystyrene, but also two- and three-block polymers composed of styrene and butadiene or of styrene and isoprene. The hydrogenation of styrene-butadiene block copolymers or styrene-isoprene block copolymers having 3 and, respectively, 5 blocks (WO 00/32646, WO 00/56783, WO 01/12681) is described, as is also the hydrogenation of styrene-butadiene star block polymers (WO 01/23437).

EP-A 505 110 discloses hydrogenated mixtures composed of styrene-butadiene block copolymers and polystyrene for optical storage media.

It is an object of the present invention to provide transparent mixtures of styrene-butadiene block copolymers with polystyrene which do not have the abovementioned disadvantages and which in particular have higher stiffness and higher heat resistance, with comparable toughness. A further object of the present invention was to provide ring-hydrogenated block copolymers which, especially in a blend with ring-hydrogenated polystyrene, has not only a very good toughness/stiffness ratio and excellent transparency, but also high heat resistance. They should also have good compatibility with hydrogenated polystyrene, in order to provide homogeneous mixtures with excellent transparency.

We have found that this object is achieved by means of the abovementioned mixtures.

The ratio of the block copolymers (I)/(II) is in the range from 0.6 to 2, preferably in the range from 0.7 to 1.5, particularly preferably in the range from 0.9 to 1.3.

Examples of vinylaromatic monomers which may be used are styrene, alpha-methylstyrene, ring-alkylated styrenes, such as p-methylstyrene or tert-butylstyrene, or 1,1-diphenylethylene, or a mixture of these.

Preferred dienes are butadiene, isoprene, 2,3-dimethylbutadiene, 1,3-pentadiene, 1,3-hexadiene, or piperylene, or a mixture of these; butadiene and isoprene are particularly preferred.

Particularly preferred block copolymers are formed from the monomers styrene and butadiene.

The blocks $B_1$ and $B_2$ may be composed exclusively of dienes or of dienes and vinylaromatic monomers. The vinylaromatic monomer/diene ratio for the blocks $B_1$ and $B_2$ is generally in the range from 0 to 1, and the vinylaromatic monomer/diene ratio in the blocks $B_1$ and $B_2$ may be identical or different. The blocks $B_1$ and $B_2$ are preferably homopolydiene blocks, in particular homopolybutadiene blocks, or copolymer blocks with a vinylaromatic monomer/diene ratio in the range from 0.3 to 0.7. The copolymer blocks particularly preferably have random distribution of the diene monomers and vinylaromatic monomers.

The transitions between the individual blocks are sharp, i.e. the composition changes suddenly.

The number-average molar mass $M_n$ of Si is in the range from 40,000 to 100,000 g/mol, preferably in the range from 45,000 to 70,000 g/mol, particularly preferably in the range from 50,000 to 60,000 g/mol. Each of the number-average molar masses $M_n$ of $S_2$, $S_3$, and $S_4$ is, independently of the others, in the range from 5,000 to 20,000 g/mol, preferably in the range from 8,000 to 17,000 g/mol, particularly preferably in the range from 11,000 to 14,000 g/mol. Each of the blocks $B_1$ and $B_2$ made from dienes, or the copolymer blocks made from dienes and from vinylaromatic monomers, independently of the others, has a number-average molar mass $M_n$ in the range from 15,000 to 40,000 g/mol, preferably in the range from 18,000 to 30,000 g/mol, particularly preferably in the range from 20,000 to 25,000 g/mol.

The block copolymers (II) preferably have a symmetrical structure, i.e. the blocks $S_3$ and $S_4$ have the same number-average molar mass $M_n$. In contrast, the block copolymers (I) are markedly asymmetrical, the ratio of the number-average molar masses of $S_1$ and $S_2$ being at least 2, preferably in the range from 5 to 8.

The mixtures of the invention may be prepared by preparing each of the block copolymers (I) and (II) by sequential anionic polymerization of vinylaromatic monomers and dienes with organo-alkali-metal initiators in succession or in different reactors, and then blending these with a ratio (I)/(II) in the range from 0.6 to 2.

The anionic polymerization initiator used may be any of the conventional mono-, bi- or multifunctional alkyl, aryl, or aralkyl compounds of an alkali metal. It is advantageous to use organolithium compounds, such as ethyl-, propyl-, isopropyl-, n-butyl-, sec-butyl-, tert-butyl-, phenyl-, diphenylhexyl-, hexamethyldi-, butadienyl-, isoprenyl- or polystyryllithium, or 1,4-dilithiobutane, 1,4-dilithio-2-butene, or 1,4-dilithiobenzene. The amount of polymerization initiator needed depends on the desired molecular weight. It is generally in the range from 0.001 to 5 mol %, based on the total amount of monomer.

The polymerization may be undertaken in the presence of a solvent. Suitable solvents are the conventional aliphatic, cycloaliphatic, or aromatic hydrocarbons having from 4 to 12 carbon atoms and used for anionic polymerization, such as pentane, hexane, heptane, cyclohexane, methylcyclohexane, isooctane, benzene, alkylbenzenes, such as toluene, xylene, ethylbenzene, or decalin, or a suitable mixture. Preference is given to the use of cyclohexane and methylcyclohexane.

The polymerization may also be carried out in the absence of solvent and in the presence of organylmetal compounds which act as retarders for the polymerization rate, for example alkylmagnesium, alkylaluminum, or alkylzinc compounds.

Once the polymerization has ended, the living polymer chains may be capped using a chain terminator. Suitable chain terminators are protonating substances or Lewis acids, for example water, alcohols, aliphatic or aromatic carboxylic acids, or else inorganic acids, such as carbonic acid or boric acid.

The blending of the block copolymers may take place at any desired juncture once the polymerization has ended, e.g. prior to or after termination, devolatilization, or other work-up steps. The chronologically or spatially separate preparation of the block copolymers (I) and (II) has the advantage that the number-average molar masses $M_n$ of the individual blocks S and B can be selected freely.

An alternative process permits the production of the block copolymers (I) and (II) by sequential anionic polymerization of vinylaromatic monomers and of dienes with organo-alkaline-metal initiators simultaneously in a single reactor, using two joint feeds of initiator and vinylaromatic monomers, the ratio of the amount of initiator $I_1$ in the first feed to the amount of initiator $I_2$ in the second feed being in the range from 0.6 to 2. After each feed, polymerization is carried out to complete conversion of the monomers. Each of the mixtures obtained by this process has the same number-average molar mass $M_n$ for the blocks $S_2$ and $S_4$ and the same number-average molar mass $M_n$ for the blocks $B_1$ and $B_2$. Table 1 summarizes the feed sequence and the polymer species formed:

TABLE 1

Feed sequence with two initiator feeds

| Stage | Monomers/Initiator | Species formed |
|---|---|---|
| 1 | Initiator ($I_1$) and vinylaromatic monomer | |
| 2 | Initiator ($I_2$) and vinylaromatic monomer | $S_1$-$I_1$<br>$S_3$-$I_2$ |
| 3 | Diene or diene and vinylaromatic monomer | $S_1$-$B_1$-$I_1$<br>$S_3$-$B_2$-$I_2$ |
| 4 | Vinylaromatic monomer | $S_1$-$B_1$-$S_2$-$I_1$<br>$S_3$-$B_2$-$S_4$-$I_2$ |
| 5 | Terminator, e.g. isopropanol | $S_1$-$B_1$-$S_2$<br>$S_3$-$B_2$-$S_4$ |

If a mixture made from diene/vinylaromatic monomer is used in stage 3, random distribution of the vinylaromatic monomers and dienes in the blocks $B_1$ and $B_2$ may be achieved by adding Lewis bases, such as tetrahydrofuran, or potassium salts, such as potassium tetrahydrolinaloolate.

The mixtures of the invention made from the linear block copolymers (I) and (II) can be used for blending the thermoplastic polymers over a wide range. Preferred mixtures comprise from 5 to 95 percent by weight of the linear block copolymers (I) and (II) and from 95 to 5 percent by weight of standard polystyrene (GPPS) or impact-modified polystyrene (HIPS). Mixtures of this type may be prepared by compounding during the devolatilization of the block copolymers, for example by adding polystyrene in the form of "Coldfeed" into a vented extruder. Joint work-up gives homogeneous ternary mixtures which are also capable of direct use by processors on non-mixing injection molding machinery. As an alternative, however, mixtures of pellets may also be processed directly in kneaders, extruders, or injection molding machinery which provides mixing, to give ternary mixtures.

The mixtures have high toughness together with high stiffness. One way in which this is apparent is in higher tensile strain at break than conventional mixtures of styrene-butadiene block copolymers with polystyrene, while modulus of elasticity is identical. They are therefore especially suitable for injection molding, and can be used for designs which save material, since they have a good toughness/stiffness ratio. The mixtures may be processed to give tough moldings, for example transparent clothes hangers which have very good dimensional stability even at relatively high temperatures.

Preference is also given to applications in extrusion, for example for producing films for thermoforming, which may then be thermoformed to give cups, lids, lunch boxes, or other containers. Here, the high toughness/stiffness ratio permits the use of thinner films with retention of strength, giving significant savings in materials.

The inventive block copolymer mixtures may be modified via partial or complete hydrogenation. The degree of hydrogenation of the olefinic double bonds is generally 97% or higher, and the degree of hydrogenation of the vinylaromatic monomers is preferably at least 90%, particularly preferably at least 95%, in particular 98%.

The proportion of the copolymerized diene units present in the 1,2-vinyl form may be controlled via the addition of substances with donor properties, for example ethers or amines.

The preferred compounds used for this purpose are tetrahydrofuran, dimethoxyethane, or 2-alkylfurfuryl ethers, in amounts of from 0.1 to 1% by volume, in particular from 0.25 to 0.5% by volume, based on the hydrocarbon used as solvent, e.g. cyclohexane.

Following the preparation of the block copolymer, the unsaturated bonds of the diene units, and also of the vinylaromatic units, of the block copolymer are hydrogenated, using a hydrogenation catalyst. It is preferable to use supported hydrogenation catalysts. Examples of suitable support materials which may be used are inorganic substrates, such as barium sulfate, silicates, carbon, or aluminum oxides. By way of example, suitable hydrogenation metals are nickel, cobalt, rhodium, ruthenium, palladium, platinum, or other metals of group 8.

The hydrogenation preferably takes place in a saturated hydrocarbon as solvent in which the block copolymer is soluble. It is preferable to use cycloaliphatic hydrocarbons, in particular cyclohexane. It is advisable for the solvent used to be the same as that used during the polymerization, so that the hydrogenation can take place in a step which follows the polymerization. The hydrogenation may take place batchwise or continuously, preference being given to continuous hydrogenation on a fixed-bed catalyst.

The hydrogenation generally takes place at temperatures in the range from 40 to 250° C., particularly preferably in the range from 120 to 180° C. The hydrogenation may be carried out at from atmospheric pressure to 350 bar, preferably in the range from 100 to 250 bar.

temperatures were measured by means of DSC in the range of −100 to 230° C. If two glass transition temperatures are stated, these are those of the soft and hard phase, respectively. If only one glass transition temperature is stated, this is that of the hard phase.

The degrees of hydrogenation stated are based on the proportion of hydrogenation of aromatic double bonds, determined via GPC, by comparing UV intensity prior to and after hydrogenation.

Modulus of elasticity, tensile strength, and tensile strain at break were determined together to ISO 527, and Charpy notched impact strength to ISO 179-1/leA(F). The Vicat B softening point was determined to ISO 306 (1994).

The transmittance measurements were made in the range from 400–700 nm on pressed plaques of thickness 1 mm.

Examples 1 to 6

The block copolymer mixtures were prepared using the information in table 2 by sequential anionic polymerization with two joint feeds of styrene and initiator (sec-butyllithium BuLi) in stage 1 or 2 at a solids content of about 30% by weight in cyclohexane at from 50 to 80° C. Once the polymerization had been completed, isopropanol was used for termination and the mixture was acidified using $CO_2$/water. In example 6, stage 3 was carried out in the presence of potassium tert-amyl alcoholate (PTA), in order to obtain a random S/B copolymer block.

TABLE 2

| Stage | | Ex. 1 | Ex. 2 | Ex. 3 | Ex. 4 | Ex. 5 | Ex. 6 |
|---|---|---|---|---|---|---|---|
| 1 | BuLi1 [mol] | 1.226 | 1.381 | 1.381 | 1.381 | 1.381 | 1.381 |
| | Styrene [kg] | 61.23 | 68.98 | 72.01 | 75.06 | 65.95 | 68.98 |
| 2 | BuLi2 [mol] | 1.631 | 1.381 | 1.381 | 1.381 | 1.381 | 1.381 |
| | Styrene [kg] | 34.66 | 33.51 | 34.98 | 36.47 | 32.04 | 33.51 |
| 3 | Butadiene [kg] | 69.45 | 63.99 | 58.03 | 52.00 | 69.97 | 43.27 |
| | Styrene [kg] | 0 | 0 | 0 | 0 | 0 | 20.72 |
| 4 | Styrene [kg] | 34.66 | 33.51 | 34.98 | 36.47 | 32.04 | 33.51 |
| Properties | Butadiene [% by weight] | 34.7 | 32 | 29 | 26 | 35 | 21.6 |
| | Structure (I)/(II) | 0.75 | 1 | 1 | 1 | 1 | 1 |
| | $M_n(S_1)$ | 62073 | 62073 | 64794 | 67544 | 59346 | 62073 |
| | $M_n(S_2)$ | 12131 | 12131 | 12663 | 13200 | 11598 | 12131 |
| | $M_n(B_1 = B_2)$ | 24312 | 23165 | 21007 | 18825 | 25328 | 23165 |
| | $M_n(S_3 = S_4)$ | 12131 | 12131 | 12663 | 13200 | 11598 | 12131 |

EXAMPLES

The butadiene content of the block copolymers was determined by means of IR spectroscopy. The number-average molecular weights Mn and the polydispersities (PDIs) were determined using GPC measurement, with calibration based on polystyrene standards. Glass transition Examples 7 to 12

Each of the block copolymer mixtures of examples 1–6 was mixed in a vented extruder with 10, 17.1, 24.4, 31.3 and 38.5 percent by weight, based on the entire mixture, of a standard polystyrene with a melt volume ratio MVR 200/5 of 3. (grade 158 K from BASF AG). The results are given in table 3.

TABLE 3

| Ex. | Mixture from Ex. | Polystyrene [% by wt.] | Vicat B [° C.] | Shore D | Modulus of elasticity [N/mm²] | Tensile stress on FR [N/mm²] | Tensile strain at FR [%] | Transm. % | Yellowness index |
|---|---|---|---|---|---|---|---|---|---|
| 7a | 1 | 10.0 | 53.5 | 66.9 | 1646 | 14.5 | 92.8 | 86.4 | 6.5 |
| 7b | 1 | 17.1 | 61.3 | 69.2 | 1745 | 15.2 | 54.8 | 79.9 | 14.7 |
| 7c | 1 | 24.4 | 66.6 | 71.6 | 1832 | 16.8 | 27.2 | 68.9 | 25.6 |
| 7d | 1 | 31.3 | 68.2 | 73.7 | 1920 | 21.2 | 19.1 | 62.9 | 30.0 |
| 7e | 1 | 38.5 | 72.8 | 74.9 | 2044 | 25.1 | 14.2 | 57.3 | 33.7 |
| 8a | 2 | 10.0 | 58.8 | 68.5 | 1763 | 13.9 | 39.4 | 85.7 | 6.3 |
| 8b | 2 | 17.1 | 64.2 | 71.4 | 1849 | 16.0 | 22.5 | 82.1 | 11.3 |
| 8c | 2 | 24.4 | 68.0 | 73.4 | 1918 | 21.1 | 19.5 | 76.8 | 16.9 |
| 8d | 2 | 31.3 | 71.4 | 75.3 | 2025 | 23.8 | 17.3 | 67.1 | 26.9 |
| 8e | 2 | 38.5 | 75.0 | 76.7 | 2134 | 25.9 | 13.9 | 63.2 | 29.8 |
| 9a | 3 | 10.0 | 66.1 | 72.7 | 1829 | 19.7 | 28.0 | 81.6 | 10.4 |
| 9b | 3 | 17.1 | 69.9 | 74.3 | 1917 | 21.2 | 25.0 | 81.4 | 11.4 |
| 9c | 3 | 24.4 | 73.7 | 75.8 | 2008 | 23.0 | 21.0 | 79.3 | 14.2 |
| 9d | 3 | 31.3 | 76.7 | 77.7 | 2112 | 25.0 | 16.4 | 75.2 | 19.2 |
| 9e | 3 | 38.5 | 79.2 | 78.8 | 2209 | 27.3 | 12.6 | 72.1 | 22.7 |
| 10a | 4 | 10.0 | 68.7 | 75.1 | 1881 | 21.3 | 23.9 | 86.7 | 5.0 |
| 10b | 4 | 17.1 | 73.0 | 76.3 | 1983 | 23.0 | 21.1 | 86.3 | 5.7 |
| 10c | 4 | 24.4 | 75.8 | 77.7 | 2072 | 25.0 | 16.5 | 84.6 | 8.2 |
| 10d | 4 | 31.3 | 78.5 | 79.2 | 2194 | 26.9 | 15.0 | 81.9 | 11.9 |
| 10f | 4 | 38.5 | 81.4 | 79.9 | 2298 | 28.9 | 11.9 | 79.4 | 15.1 |
| 11a | 5 | 10.0 | 56.3 | 64.7 | 1714 | 13.8 | 83.3 | 85.2 | 6.9 |
| 11b | 5 | 17.1 | 57.7 | 67.7 | 1813 | 14.4 | 32.1 | 79.2 | 15.0 |
| 11c | 5 | 24.4 | 62.8 | 70.8 | 1899 | 14.6 | 23.3 | 70.4 | 24.3 |
| 11d | 5 | 31.3 | 65.8 | 72.9 | 1987 | 20.2 | 20.2 | 64.4 | 28.9 |
| 11e | 5 | 38.5 | 72.6 | 74.9 | 2119 | 24.5 | 17.7 | 57.3 | 33.4 |
| 12a | 6 | 10.0 | 64.3 | 75.2 | 1732 | 22.0 | 25.5 | 86.2 | 5.8 |
| 12b | 6 | 17.1 | 67.5 | 77.0 | 1798 | 24.4 | 16.2 | 84.9 | 7.8 |
| 12c | 6 | 24.4 | 70.7 | 78.6 | 1897 | 25.7 | 13.6 | 81.7 | 11.5 |
| 12d | 6 | 31.3 | 73.7 | 79.6 | 2024 | 28.1 | 11.0 | 78.9 | 14.5 |
| 12e | 6 | 38.5 | 77.7 | 80.5 | 2178 | 29.3 | 9.9 | 75.6 | 18.1 |

Examples 13 to 15

4790 mL of dry cyclohexane were heated to 50° C. under inert conditions in a 10 L stirred tank. sec-Butyllithium (s.-BuLi 1) in the form of a 1.5 molar n-hexane solution was added, as was 0.4% by volume of tetrahydrofuran, based on the initial charge of cyclohexane, and the mixture was stirred for 5 minutes.

After a first addition of styrene, the mixture was polymerized for 15 minutes. A second addition of initiator (s.-BuLi 2) was made to initiate new polymer chains, and further styrene was added in portions to continue block build-up. The reaction time for build-up of a styrene block was 15 minutes, and that for a butadiene block was 40 minutes. The polymerization was terminated by adding 3 mL of isopropanol. 0.1% by weight of Kerobit TBK (2,6-di-tert-butyl-p-cresol), based on the solids content of the block copolymer, was added for stabilization. Table 4 gives the amounts of styrene, butadiene, and sec-butyllithium used in each of the stages, and also gives the properties of the resultant block copolymer mixtures.

TABLE 4

| | | Ex. 13 | Ex. 14 | Ex. 15 |
|---|---|---|---|---|
| Stage 1 | Styrene [g] | 485 | 716 | 716 |
| | s.-BuLi 1 [mL] | 7.97 | 7.97 | 7.97 |
| Stage 2 | Styrene [g] | 264 | 272 | 272 |
| | s.-BuLi 2 [mL] | 7.97 | 7.97 | 7.97 |
| Stage 3 | Butadiene [g] | 411 | 411 | 351 |
| Stage 4 | Styrene [g] | 208 | 264 | 264 |
| | Butadiene content [%] | 30 | 27 | 25 |

TABLE 4-continued

| | Ex. 13 | Ex. 14 | Ex. 15 |
|---|---|---|---|
| Proportion of 1,2-linkages in polybutadiene [%] | 44 | 41 | 41 |
| Mn [g/mol] | 75600 | 85700 | 80800 |
| PDI | 1.18 | 1.25 | 1.24 |
| Tg [° C.] | −65/98 | −68/99 | −67/99 |

Examples 16 to 18

The block copolymer mixtures of examples 13 to 15, in the form of 5% strength by weight solutions in cyclohexane, were hydrogenated by means of a Pt/C hydrogenation catalyst (5% of Pt on activated charcoal) with a polymer/catalyst ratio by weight of 10:3, at 200° C. and 250 bar of hydrogen, for 24 hours. Conversion of the GPC curves (TI signal) prior to and after hydrogenation showed no reduction in molecular weight. The properties of the hydrogenated block copolymer mixtures are given in table 5.

TABLE 5

| | Ex. 16 | Ex. 17 | Ex. 18 |
|---|---|---|---|
| Degree of hydrogenation [%] | 99.6 | 100 | 100 |
| Modulus of elasticity [GPa] | 1.41 | 1.6 | 1.56 |
| Tensile strength [MPa] | 35.6 | 43.4 | 42.7 |

TABLE 5-continued

|  | Ex. 16 | Ex. 17 | Ex. 18 |
|---|---|---|---|
| Tensile strain at break [%] | 85 | 70 | 62 |
| Tg [° C.] | −55/127 | −54/133 | −55/130 |
| Vicat B [° C.] | 113 | 113 | 115 |
| Charpy, notched 23° C. | 2.52 | 3.22 | 2.58 |
| Transmittance [%] | >92 | >91 | >91 |

Examples 19 to 21

In each case, a total of 20 g of ring-hydrogenated block copolymer mixtures of examples 16 to 18, with ring-hydrogenated polystyrene (PCHE via hydrogenation of PS 158 K from BASF Aktiengesellschaft), were dissolved in 200 mL of cyclohexane and stirred at room temperature. The solvent is then completely removed in vacuo at 80° C. The proportions by weight of PCHE and the properties of the blends are given in table 6. Modulus of elasticity, tensile strength, and tensile strain at break were determined on tensil specimens to ISO 3167 (all dimensions being ⅛ of those of the master specimen), using a method based on ISO 527.

TABLE 6

| | Example | | | | | | | | |
|---|---|---|---|---|---|---|---|---|---|
| | 19a | 19b | 19c | 20a | 20b | 20c | 21a | 21b | 21c |
| Block copolymer mixture from example | 16 | 16 | 16 | 17 | 17 | 17 | 18 | 18 | 18 |
| Proportion by weight of PCHE [%] | 10 | 17 | 50 | 10 | 17 | 50 | 10 | 17 | 50 |
| Modulus of elasticity [GPa] | 1.42 | 1.52 | 2.07 | 1.49 | 1.72 | 2.22 | 1.77 | 1.96 | 2.33 |
| Tensile strength [MPa] | 40.4 | 43.8 | 61.4 | 43.2 | 53 | 66.7 | 53 | 56 | 68.8 |
| Tensile strain at break [%] | 117 | 97 | 8 | 69 | 69 | 6 | 71 | 67 | 6 |
| Tg [° C.] | 139 | 140 | 143 | | 140 | 145 | 140 | 140 | 143 |
| Transmittance [%] | >88 | >86 | >82 | >89 | >86 | >90 | >88 | >86 | |

We claim:

1. A mixture comprising linear block copolymers made from vinylaromatic monomers and from dienes of the structure
   (I) $S_1$-$B_1$-$S_2$ and
   (II) $S_3$-$B_2$-$S_4$, where
   $S_1$ is a block made from vinylaromatic monomers with number-average molar mass $M_n$ in the range from 40,000 to 100,000 g/mol,
   each of $S_2$, $S_3$ and $S_4$ is a block made from vinylaromatic monomers with number-average molar mass $M_n$ in the range from 5,000 to 20,000 g/mol,
   each $B_1$ and $B_2$ is a block made from dienes or a copolymer block made from dienes and from vinylaromatic monomers with number-average molar mass $M_n$ in the range from 15,000 to 40,000 g/mol, and
   the molar ratio of the block copolymers (I)/(II) is in the range from 0.6 to 2.

2. A mixture as claimed in claim 1, wherein the molar ratio of the block copolymers (I)/(II) is in the range from 0.7 to 1.5.

3. A mixture as claimed in claim 1, wherein the ratio of vinylaromatic monomer to diene in the blocks $B_1$ or $B_2$ is in the range from 0.3 to 0.7.

4. A mixture as claimed in claim 1, wherein each of the blocks $B_1$ and $B_2$ is a copolymer block made from dienes and from vinylaromatic monomers with random distribution.

5. A mixture as claimed in claim 1, wherein the number-average molar mass $M_n$ of
   $S_1$ is in the range from 45,000 to 70,000 g/mol, that of each of $S_2$, $S_3$, and $S_4$ is in the range from 8,000 to 17,000 g/mol, and that of
   each of $B_1$ and $B_2$ is in the range from 18,000 to 30,000 g/mol.

6. A mixture as claimed in claim 1, wherein the blocks $S_3$ and $S_4$ have the same number-average molar masses $M_n$.

7. A mixture as claimed in claim 1, wherein the number-average molar masses $M_n$ of $S_2$ and $S_4$ are identical, and the number-average molar masses of $B_1$ and $B_2$ are identical.

8. A mixture as claimed in claim 1, which comprises from 5 to 95 percent by weight of the linear block copolyiners (I) and (II) and from 95 to 5 percent by weight of standard polystyrene or impact-modified polystyrene.

9. A mixture, obtainable by partial or complete hydrogenation of the mixture as claimed in claim 1.

10. A mixture as claimed in claim 9, wherein the degree of hydrogenation of the vinylaromatic monomer units is at least 90%.

11. A mixture as claimed in claim 9, wherein, prior to the hydrogenation, and based on the entirety of the diene units, more than 30% of the copolyrnerized diene units are present in the 1,2-vinyl form.

12. A process for producing mixtures as claimed in claim 1, which comprises preparing each of the block copolymers (I) and (II) by sequential anionic polymerization of vinylaromnatic monomers and of dienes with organo-alkali metal initiators in different batches, and then blending these with a molar ratio (I)/(II) in the range 0.6 to 2.

13. A process for preparing mixtures as claimed in claim 7, which comprises preparing the block copolymers (I) and (II) by sequential anionic polymerization of vinylaromatic monomers and of dienes using organo-alkali metal initiators simultaneously in one reactor using two joint feeds of initiator and vinylaroniatic monomers, where the molar ratio of the amount of initiator $I_1$ in the first feed to the amount of initiator $I_2$ in the second feed is in the range from 0.6 to 2.

14. A process for preparing mixtures of ring-hydrogenated block copolyiners encompassing the steps of:
   a) producing the mixture as claimed in claim 1 by preparing each of the block conolymers (I) and (II) by sequential anionic polymerization of the vinylaromatic monomers and dienes with organo-alkali metal initiators in different batches and then blending these with a molar ratio (I)/(II) in the range from 0.6 to 2.
   b) termination of the polymerizations, using a protic terminator or a coupling agent,
   c) hydrogenation of the resultant block copolymer mixture using a hydrogenation catalyst.

15. A process as claimed in claim 14, wherein step a) is carried out in a cycloaliphatic hydrocarbon as solvent, and in the presence of from 0.3 to 0.5% by volume, based on the solvent, of an ether.

16. Optical media comprising the mixture claimed in claim 9.

17. A process for preparing mixtures of ring hydrogenated block copolymers encompassing the steps of:
   a) producing the mixture as claimed in claim 7 by preparing the block copolymers (I) and (II) by sequential anionic polymerization of the vinylaromatic monomers and dienes using organo-alkali metal initiators simultaneously in one reactor using two joint feeds of initiator and vinylaromatic monomers, where the molar ratio of initiator $I_1$ in the first feed to the amount of initiator $I_2$ in the second feed is in the range from 0.6 to 2,
   b) tennination of the polymerizations, using a protic tenninator or a coupling agent,
   c) hydrogenation of the resultant block copolymers mixture using a hydrogenation catalyst.

* * * * *